United States Patent
Pubanz

Patent Number: 6,048,107
Date of Patent: Apr. 11, 2000

[54] CRYOGENIC OPTICAL/ELECTRICAL INTERCONNECT MODULE

[75] Inventor: George Pubanz, Hillsboro, Oreg.

[73] Assignee: Tektronix, Inc., Beaverton, Oreg.

[21] Appl. No.: 09/073,007

[22] Filed: May 5, 1998

[51] Int. Cl.[7] .................................................. G02B 6/36
[52] U.S. Cl. .............................. 385/92; 385/49; 385/83; 385/89
[58] Field of Search ................................ 385/49, 53, 83, 385/88, 92, 89

[56] References Cited

U.S. PATENT DOCUMENTS

| | | | |
|---|---|---|---|
| 4,772,086 | 9/1988 | Bellerby et al. | 350/96.17 |
| 5,163,113 | 11/1992 | Melman | 385/31 |
| 5,446,815 | 8/1995 | Ota et al. | 385/33 |
| 5,627,931 | 5/1997 | Ackley et al. | 385/88 |
| 5,671,315 | 9/1997 | Tabuchi et al. | 385/137 |
| 5,960,141 | 9/1999 | Sasaki et al. | 385/88 |

OTHER PUBLICATIONS

"Hybrid Optical Receiver for Longer–Wavelength Optical Communication Systems", Jan. 17, 1980 vol. 16 No. 2, Electronics Letters.

"Optical Interconnects for High Speed Computing", Oct. 1986 vol. 25 No. 10 ISSN 0091–3286.

*Primary Examiner*—Hemang Sanghavi
*Assistant Examiner*—Benjamin Cushwa
*Attorney, Agent, or Firm*—Francis I. Gray

[57] ABSTRACT

A cryogenic optical/electrical interconnect module has optical fibers captivated by an optical fiber fixture. The optical fiber fixture includes a stress support section that captivates the buffers protecting the optical fibers in V-grooves, while the bared optical fibers are laid in V-grooves in a carrier portion that has a slant edge at the end. A photodiode fixture of the same material as the optical fiber fixture has a photodiode array mounted thereon, and the optical fiber fixture is aligned with the photodiode array so that optimal optical energy is coupled from the optical fibers to the photodiodes. The fixtures are mounted in a cavity of a conductive substrate and a circuit board is mounted on the top surface of the substrate surrounding the cavity. The circuit board has microstrip lines, and the photodiodes are electrically coupled to the microstrip lines by flexible microstraps. A thermal transition block may be mounted in the cavity between the substrate and the fixtures. This structure provides for alignment at room temperature while maintaining the alignment over an extended temperature range.

5 Claims, 4 Drawing Sheets

CRYOGENIC OPTICAL/ELECTRICAL INTERCONNECT MODULE

STATEMENT REGARDING FEDERALLY SPONSORED RESEARCH OR DEVELOPMENT

This invention was made with Government support under Contract No. MDA972-92-C-0011 awarded by the Defense Advanced Research Projects Agency. The Government has certain rights in this invention.

CROSS-REFERENCE TO RELATED APPLICATIONS

Not applicable.

BACKGROUND OF THE INVENTION

The present invention relates to interfaces between optical and electrical signals, and more particularly to a cryogenic optical/electrical interconnect module for providing a high-speed optical to electrical interface from an optical fiber array to a photodiode array at cryogenic temperatures.

It is difficult to align an array of optical fibers to an array of photodiodes for use at cryogenic temperatures. Each fiber must be correctly aligned with the corresponding photodiode to a precision of approximately ten micrometers. Also the alignment, which can only be conveniently accomplished near room temperature, must remain true as the resulting module is cooled to cryogenic temperatures—less than seventy degrees Kelvin.

Prior optical/electrical interconnects, as described by P. R. Haugen et al in *Optical Interconnects for High Speed Computing*, Optical Engineering 25(10), 1076–1085, 1985, use silicon V-grooves to provide optical fiber captivation for alignment purposes. An angle polished fiber end is used to direct the optical output through the side of the fiber using total internal reflection, as originally described by D. R. Smith et al in *P-I-N/F.E.T. Hybrid Optical Receiver for Longer-Wavelength Optical Communication Systems*, Electronics Letters, 16(2), 69–71, 1980. However these prior optical/electrical interconnects make no effort to match thermal coefficients of gallium arsenide and silicon with the package.

What is desired is a cryogenic optical/electrical interconnect module that provides optical coupling between an array of fibers and an array of photodiodes and is easily alignable at one temperature while staying aligned through major temperature excursions.

BRIEF SUMMARY OF THE INVENTION

Accordingly the present invention provides a cryogenic optical/electrical interconnect module for coupling an array of fibers to an array of photodiodes that is easily alignable and maintains the alignment through major temperature excursions. A silicon photodiode fixture holds the photodiode array of a material such as gallium arsenide, which fixture is located in a cavity in a conductive substrate base such as copper upon which is mounted a circuit board. An intermediate layer of a material with a thermal coefficient intermediate that of the fixture and the photodiode array, such as molybdenum, provides a thermal transition between the two. The photodiode array is electrically coupled to microstrip lines on the circuit board via microstraps. A silicon optical fiber fixture has V-grooves in which are laid the optical fibers, with one end being lapped and polished to form a slant edge. The optical fiber fixture includes a stress support section that captivates the buffer surrounding the optical fibers in similar V-grooves. The optical fiber fixture is adjusted in three degrees of freedom relative to the photodiode array by observing the electrical output from selected ones of the photodiodes when light is input to the optical fibers, and securing the optical fiber fixture in place when the electrical output is optimized.

The objects, advantages and other novel features of the present invention are apparent from the following detailed description when read in conjunction with the appended claims and attached drawing.

DETAILED DESCRIPTION OF THE INVENTION

Figure 1:
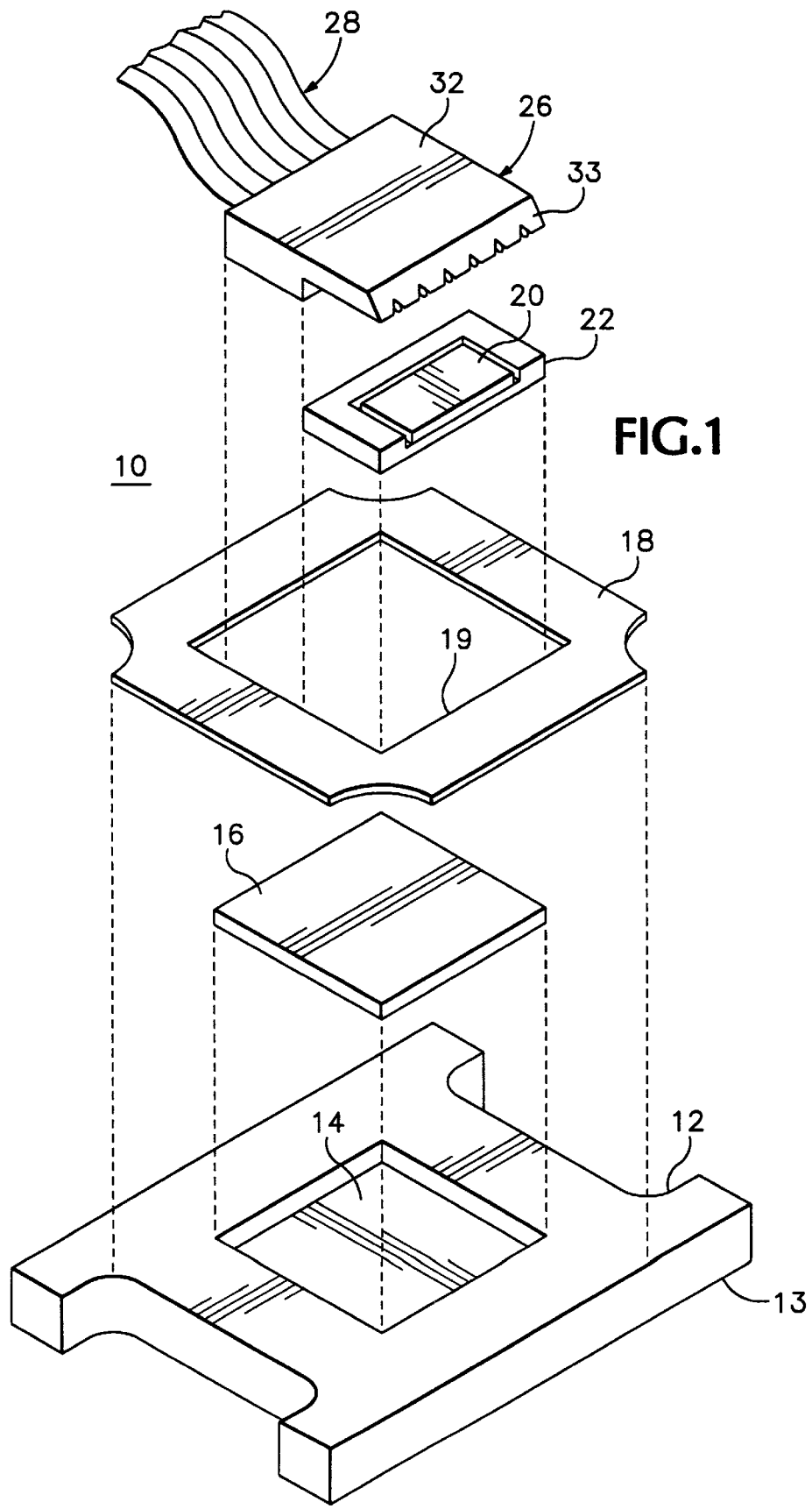
FIG. 1 is an exploded view of a cryogenic optical/electrical interconnect module according to the present invention.
Figure 2:
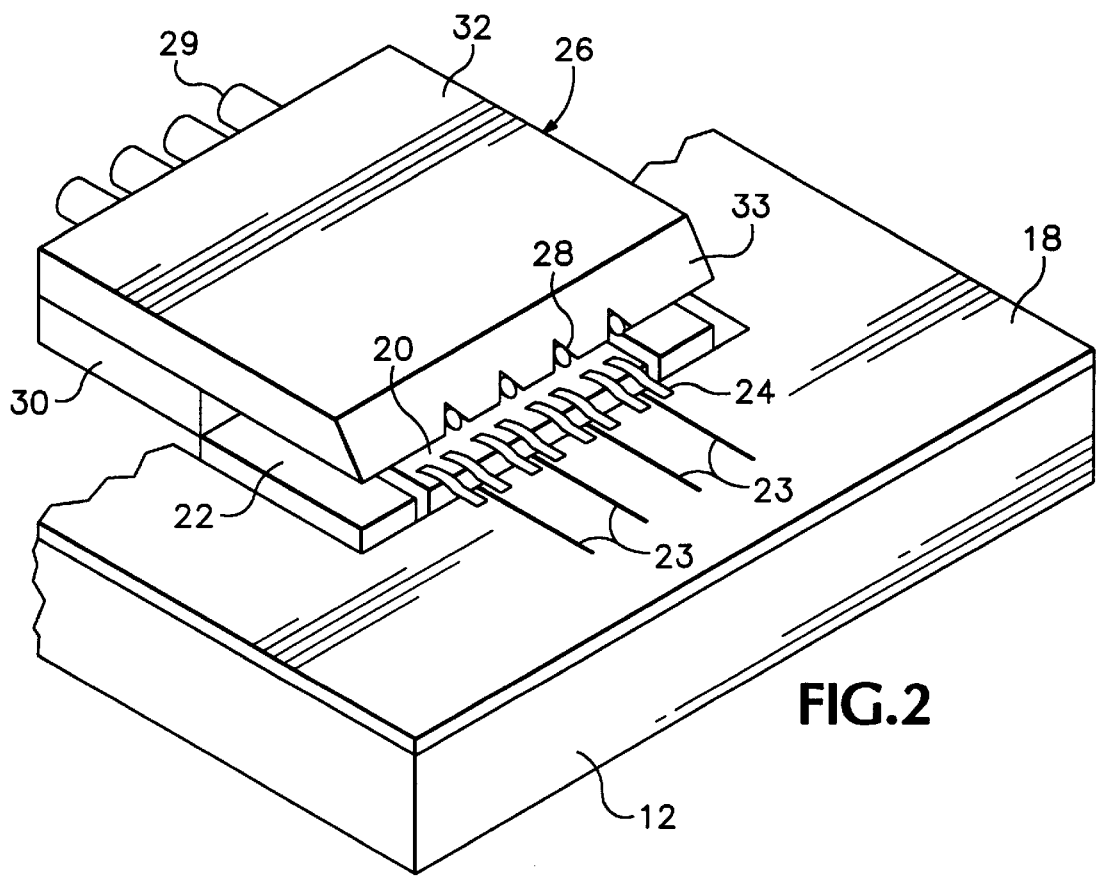
FIG. 2 is a perspective view partially exploded of the cryogenic optical/electrical interconnect module according to the present invention.

Referring now to FIG. 1 an exploded view of a cryogenic optical/electrical interconnect module 10 is shown having a conductive substrate base 12 of a material, such as copper that may also be gold-plated. The conductive substrate base 12 has a central cavity 14. A thermal transition block 16 of a material having an intermediate thermal coefficient of expansion between the material of the conductive substrate base 12 and silicon, such as molybdenum, may be fixed within the central cavity 14 of the substrate base 12. Molybdenum has an intermediate thermal coefficient that is closer to that of silicon than copper. The thermal transition block 16 also may be gold-plated, at least on the side in contact with the substrate base 12 to provide ease of soldering the block to the base. On top of the substrate base 12 is a circuit board 18 having a central hole 19 corresponding to the cavity 14 in the substrate. The circuit board 18 may be made of a low loss, high dielectric material, such as TMM©10i manufactured by Rogers Corporation of Chandler, Ariz., which exhibits low thermal coefficient and isotropic dielectric constant with a thermal expansion coefficient closely matched to copper. A gallium arsenide (GaAs) photodiode array 20 is mounted, such as by epoxy, on a silicon photodiode fixture 22 which is placed in the cavity 14 on the thermal transition block 16. The photodiodes are coupled to microstrip transmission lines 23 on the circuit board 18 by flexible conductive straps 24 and associated vias, as shown in FIG. 2. An optical fiber fixture 26 has a plurality of V-grooves etched in it, and the optical fibers 28 are laid in such V-grooves. The optical fiber fixture 26, shown partially exploded from the photodiode array fixture 22, is mounted to the silicon photodiode fixture, such as by epoxy, so that the ends of the optical fibers 28 are optically coupled to the photodiodes in the photodiode array 20, as is explained below and shown in FIG. 3.

Figure 3:
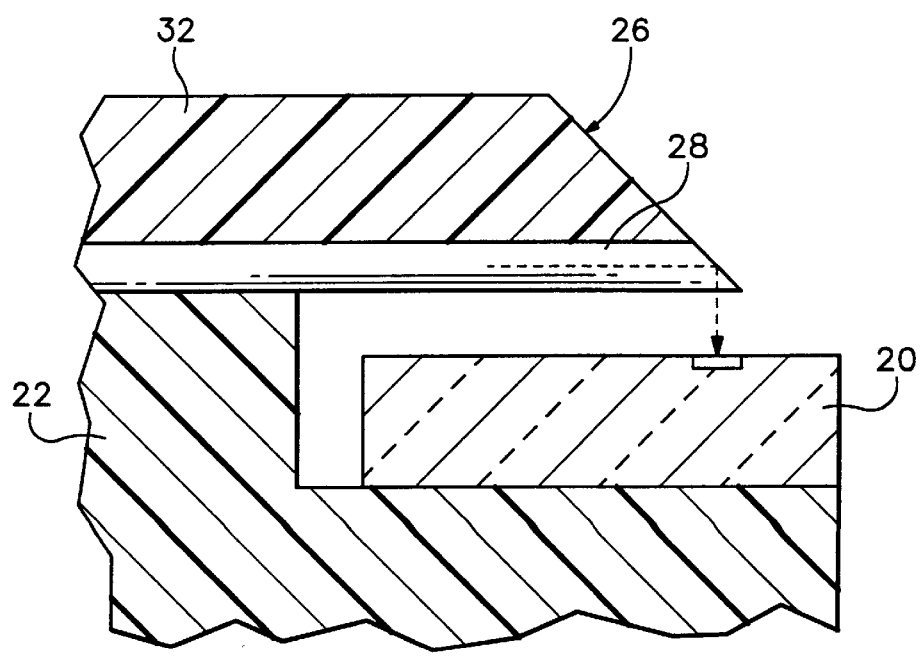
FIG. 3 is a cross-sectional view of a portion of the silicon fixtures for the cryogenic optical/electrical interconnect module according to the present invention.
Figure 4:
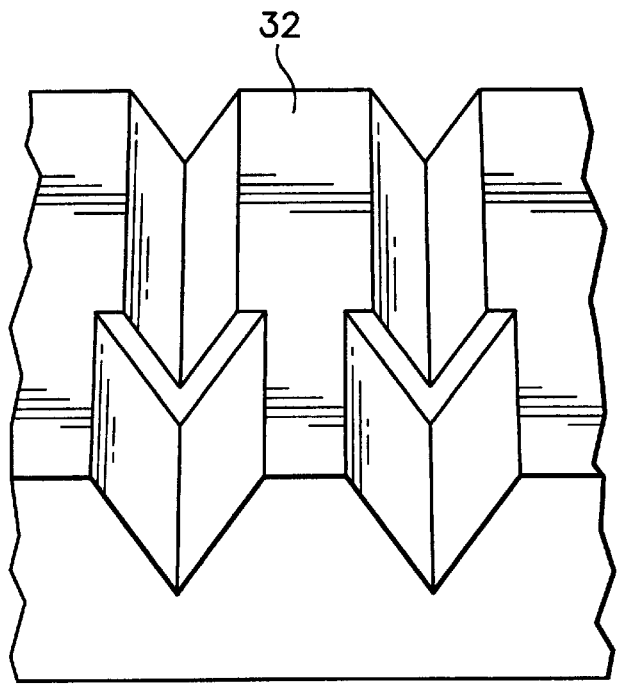
FIG. 4 is a perspective view of a portion of the V-grooves for the cryogenic optical/electrical interconnect module according to the present invention.
Figure 5:
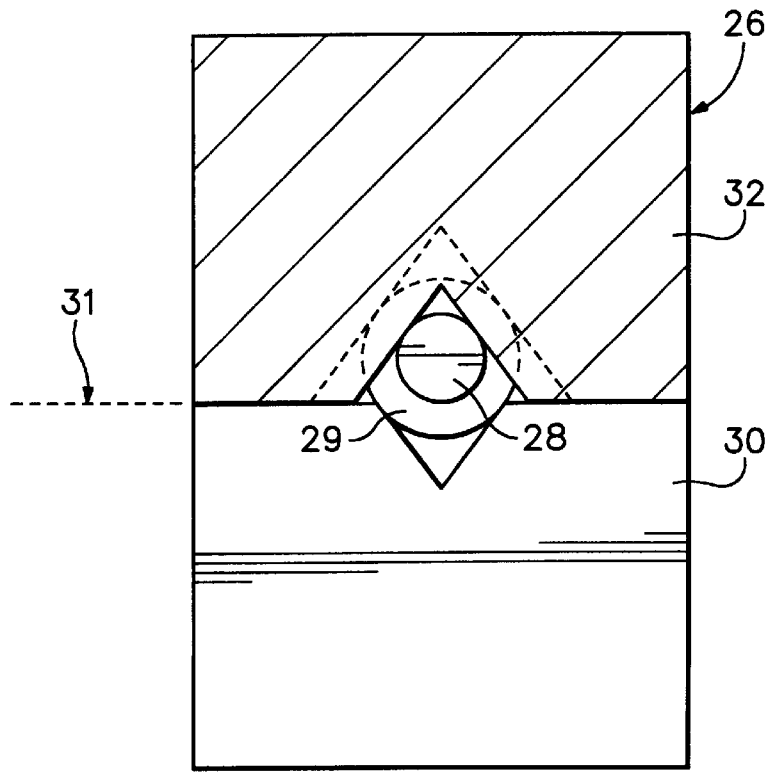
FIG. 5 is an axial partial cross-sectional view of a portion of the optical fiber fixture for the cryogenic optical/electrical interconnect module according to the present invention.
Figure 6:
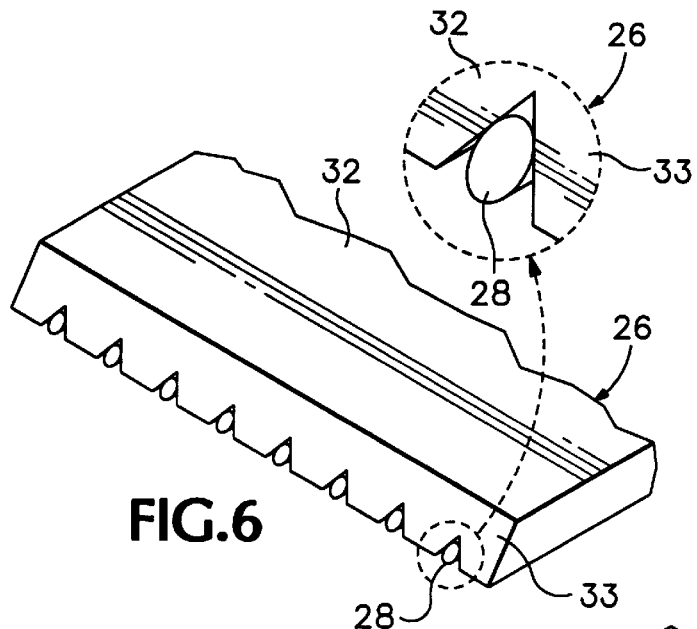
FIG. 6 is an enlarged view of the slant edge of a portion of the V-groove optical fiber fixture for the cryogenic optical/electrical interconnect module according to the present invention.

The optical fiber fixture 26 has a stress support section 30 with a plurality of V-grooves. The fibers 28 have a buffer portion 29 that protects the fiber and which is stripped away from the ends of the fibers adjacent the photodiodes. The buffer portion extends the length of the V-grooves in the stress support section 30. The purpose of the stress support section 30 is to provide strain relief for the captivated fibers 28. A carrier portion 32 of the optical fiber fixture 26 has a similar plurality of V-grooves, but the V-grooves have two different dimensions, as shown in FIG. 4. For the length of the stress support section 30 the V-groove is wider to accomodate the buffer 29 of the fiber 28, and the V-groove is narrower for the remaining run to the end 33 of the carrier portion 32. The narrower V-groove portions in the optical fiber carrier portion 32 have dimensions so that the core of the fiber 28 rests at the level of the plane 31 of the stress support section 30, as shown in FIG. 5. The end 33 of the carrier portion 32 is beveled together with the end of the fiber 28, as shown in FIGS. 3 and 6. The V-grooves fully envelop the bare fiber 28 as well as provide support to the fiber buffer 29.

Figure 7:
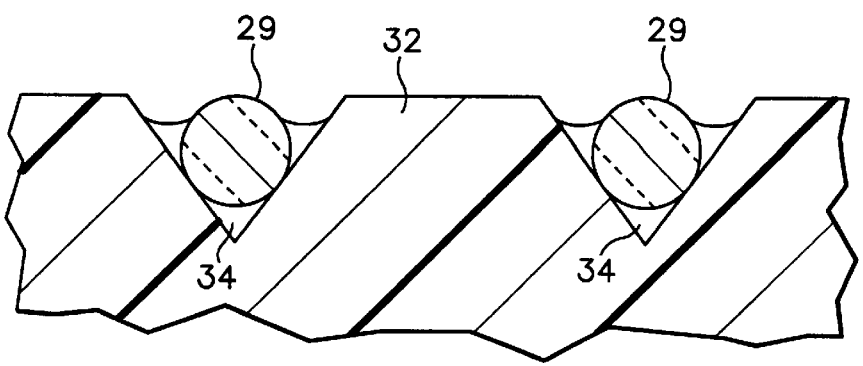
FIG. 7 is a cross-sectional view of a portion of the optical fiber fixture for the cryogenic optical/electrical interconnect module according to the present invention.

The multiple optical fibers 28 are attached onto the V-grooves in the carrier portion 32 using an epoxy, such as Eccobond 27, a low viscosity and air curable epoxy manufactured by Emerson & Cuming Specialty Polymers of Lexington, Mass. The fibers 28 are aligned and positioned into the V-grooves and the epoxy 34 is applied around them, as shown in FIG. 7 in cross-section, and flows by capillary force through the V-grooves to reach the complete length of the bared fibers. The epoxy flow may be expedited by heating the fiber end to 50° C. The fibers 28 rest in the V-grooves so that no surface is above the surface of the carrier portion 32, and the epoxy 34 does not cover the exposed portion of the fibers.

Figure 8:
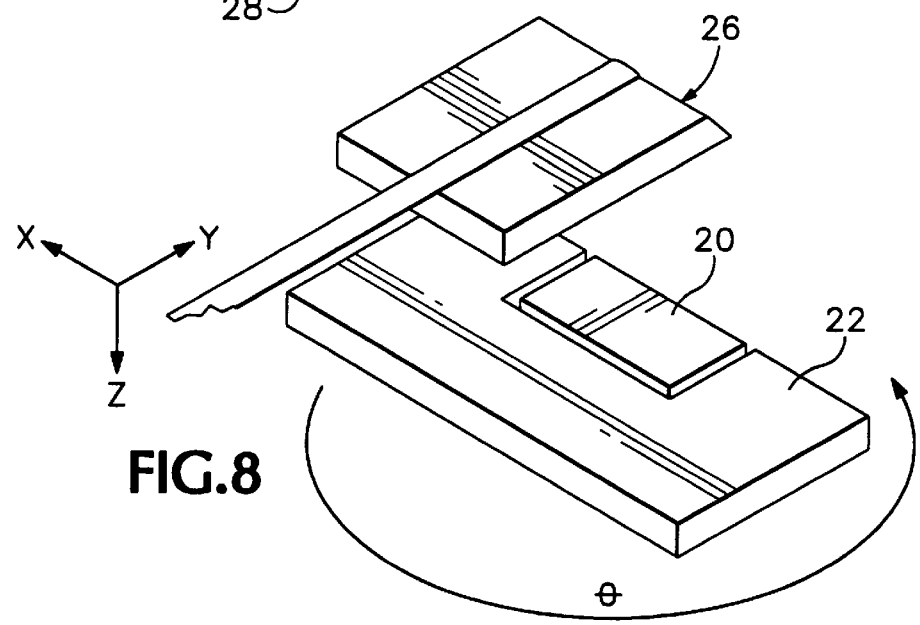
FIG. 8 is an illustration of the alignment of the optical fiber fixture with a photodiode array in a photodiode fixture for the cryogenic optical/electrical interconnect module according to the present invention.

After the fibers 28 are bonded into the V-grooves, the optical fixture 26 is mounted in a lapping fixture to polish the slant edge 33. The resulting optical fixture 26 is then aligned with the photodiode array 20 using three degrees of freedom—the x- and y-axes and rotation. An alumina strip 36, as shown in FIG. 8, is temporarily mounted on the back of the optical fixture 26 and secured in a suitable x/y adjustment device (not shown). The interconnect module 10 with the photodiode fixture 22 is mounted on a rotational platform (not shown). The outputs from selected ones of the photodiodes, such as the outer two photodiodes in the photodiode array 20, are monitored while light is injected into the fibers 28. The optical fixture 26 is adjusted with respect to the photodiode array 20 in the three degrees of freedom until an optimal output is achieved from the monitored photodiodes. The optical fixture 26 is then secured by epoxy to the interconnecting module 10 correctly aligned with the photodiode array 20.

Thus the present invention provides a robust, easily aligned optical/electrical interconnect module that is assembled using as much as possible same material components, appropriate fixtures and epoxy adhesives, which module maintains good alignment between the optical fibers and the photodiodes throughout a working range of temperatures between room temperature and 50 K, producing a digital interconnect scheme with very high bandwidth provided by the optical fiber combined with high thermal isolation due to the low thermal conductivity of the fiber.

What is claimed is:

1. A cryogenic optical/electrical interconnect module for coupling light from optical fibers to photodetectors comprising:

an optical fiber fixture having a stress support section and a carrier portion with an entry face and an opposing slant edge face, the optical fibers being captivated in V-grooves, the V-grooves in the carrier portion being of two dimensions; a wider dimension where the carrier portion overlaps the stress support section and a narrower dimension otherwise, fiber buffers of the optical fibers being captured between the stress support section and the carrier portion in the V-grooves; and a photodetector fixture of the same material as the optical fiber fixture upon which are mounted the photodetectors, the optical fiber fixture being aligned with the photodetectors such that optical energy from the optical fibers at the slant face is optimally coupled to the photodetectors.

2. The interconnect module a s recited in claim 1 wherein the material of the photodetector fixture and the optical fiber fixture comprises silicon, and the photodetectors comprise gallium arsenide photodiodes.

3. The interconnect module are recited in claim 1 further comprising:

a conductive base substrate having a top surface and having a central cavity within which the optical fiber fixture and photodetector fixture are mounted;

a circuit board having microstrip lines mounted on the top surface of the conductive base substrate; and means for coupling the photodetectors electrically to the microstrip lines.

4. The interconnect module as recited in claim 3 further comprising a thermal transition block mounted in the cavity between the conductive base substrate and the fixtures.

5. The interconnect module as recited in claim 4 wherein the thermal transition block is comprised of a material having a thermal coefficient of expansion between that of the conductive base plane material and the material of the fixtures.

* * * * *